June 24, 1958   M. J. MILES ET AL   2,840,392
VEHICLE TOWBAR
Filed Oct. 9, 1956   2 Sheets-Sheet 1

Mearl J. Miles
Andrew J. Jones
INVENTORS.

BY Clarence A. O'Brien
and Harvey B. Jacobson
Attorneys

June 24, 1958 M. J. MILES ET AL 2,840,392
VEHICLE TOWBAR

Filed Oct. 9, 1956 2 Sheets-Sheet 2

Mearl J. Miles
Andrew J. Jones
INVENTORS.

BY *Clarence A. O'Brien*
*and Harvey B. Jackson*
Attorneys 2,840,392

VEHICLE TOWBAR

Mearl J. Miles and Andrew J. Jones, The Dalles, Oreg.

Application October 9, 1956, Serial No. 614,880

1 Claim. (Cl. 280—493)

This invention relates to towbars or hitches for motor vehicles and more particularly to a hitch that is adapted to be secured to the bumper of a motor vehicle.

An object of the present invention is to provide a hitch or towbar which is adapted to be connected to a motor vehicle bumper by improved clamping devices which hold very securely onto the bumper, the hitch being adjustable so as to alter the spread thereof, whereby it may fit more properly onto motor vehicles of various makes.

A further object of the present invention is to provide a hitch which is adapted to be secured to the motor vehicle bumper between the bumper guards, using the latter as an abutment and also using the front face of the bumper as an abutment, whereby a very secure and steady hitch is devised.

A further object of the present invention is to provide a hitch as described previously which is capable of being folded to a very neat and compact position for easy storage and transportation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is a transverse sectional view taken on the line 5—5 of Figure 1; and

Figure 6 is a sectional view taken on the line 6—6 of Figure 1.

Figure 1:
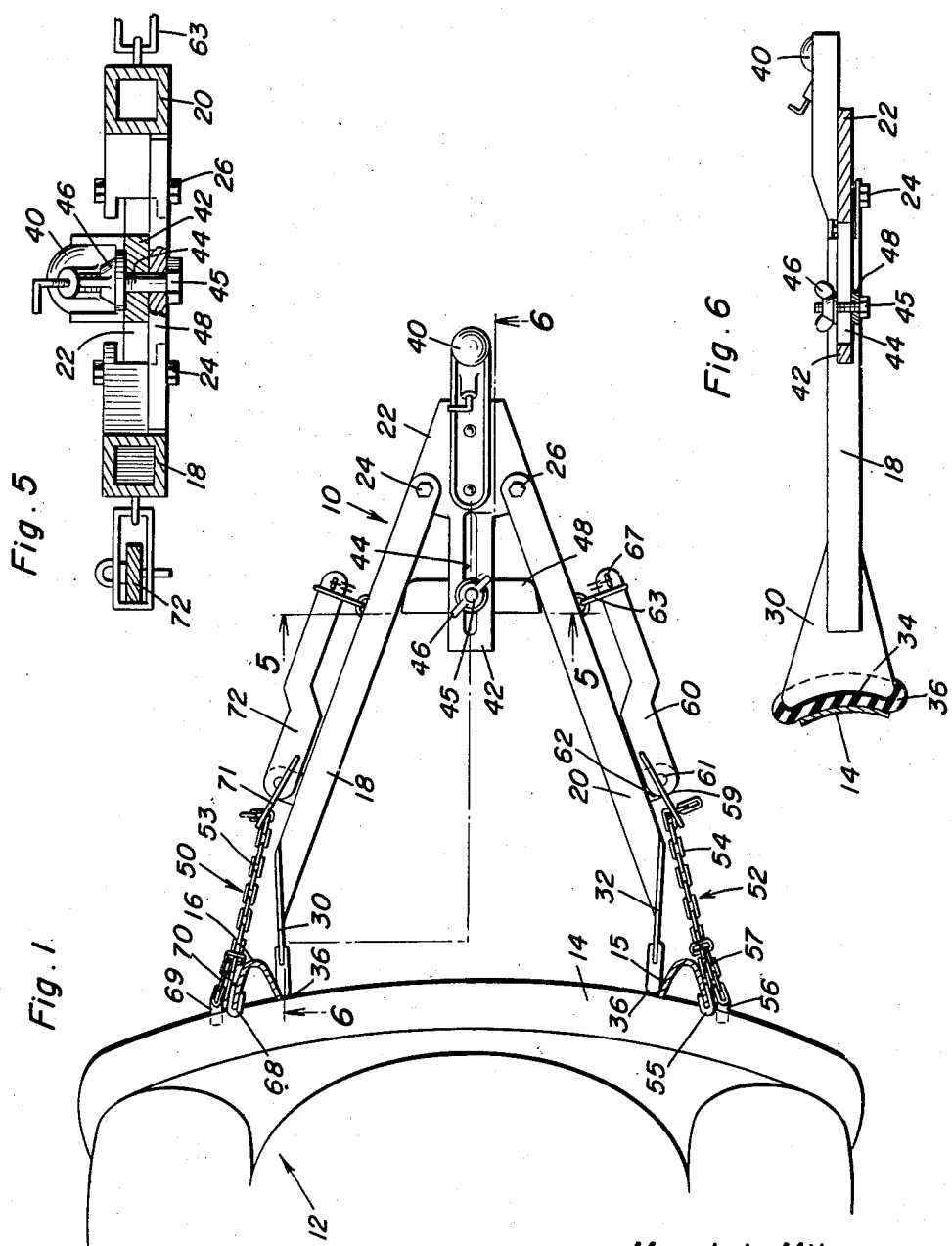
Figure 1 is a top plan view of a hitch which is constructed in accordance with the invention, the hitch being shown attached to the front bumper of a motor vehicle.

In the accompanying drawings there is a hitch 10 which is constructed in accordance with the invention. This hitch is shown in an operative position on the front of a motor vehicle 12, the latter including various structures which are conventional, among which are the front bumper 14 and bumper guards 15 and 16 that are usually bolted thereon. Hitch 10 consists of a pair of draft arms 18 and 20, respectively, which when in the towing, operative position converge to a support plate 22 to which they are pivotally attached, as by bolts 24 and 26. Although draft arms 18 and 20 may be of various cross-sectional shapes, a box beam (Figure 5) is considered preferable in view of its strength. When a box beam is used, the ends will be cut away along the vertical walls in order to have the upper and lower walls form tabs through which the bolts 24 and 26 are passed. In this way, the draft arms 18 and 20 are capable of pivotal movement with respect to the support 22.

The outer, diverging ends of the arms 18 and 20 have plates 30 and 32 welded or otherwise attached thereon, these plates extending rearwardly and having smoothly curved faces 34 of approximately the general contour of motor vehicle bumper 14. A resilient pad 36, as rubber, plastic or felt or other suitable material, is attached to the curved face 34 of each plate 30 and 32. This is to protect the finish of the bumper 14 when the pads fit snugly there against. It is preferred that the pads be immediately adjacent and contacting slightly the bumper guards 15 and 16, the latter preventing the arms from sliding laterally of the motor vehicle.

A conventional trailer hitch is used in connection with the towbar. This trailer hitch may be of any manufacturer's make, one being selected for illustration in the drawing. One part 40 of the trailer hitch is attached to the support member 22 and the other part will be attached to the towing vehicle. Bracket 42 extends from the support 22 in a direction opposite to the hitch part 40 and has an elongated slot 44 therein. This slot accommodates bolt 45 on which there is wing nut 46. The bolt passes through a brace 48 that is disposed on bracket 42. The ends of the brace 48 are contacted by draft arms 18 and 20 when they are in their spread position (Figure 1) and the wing nut 46 is tightened in place. Should the draft arms be drawn together closer or spread apart farther, the brace 48 would be adjusted on the bracket 42 and tightened in place by means of the wing nut 46 so as to function as a brace.

Figure 2:
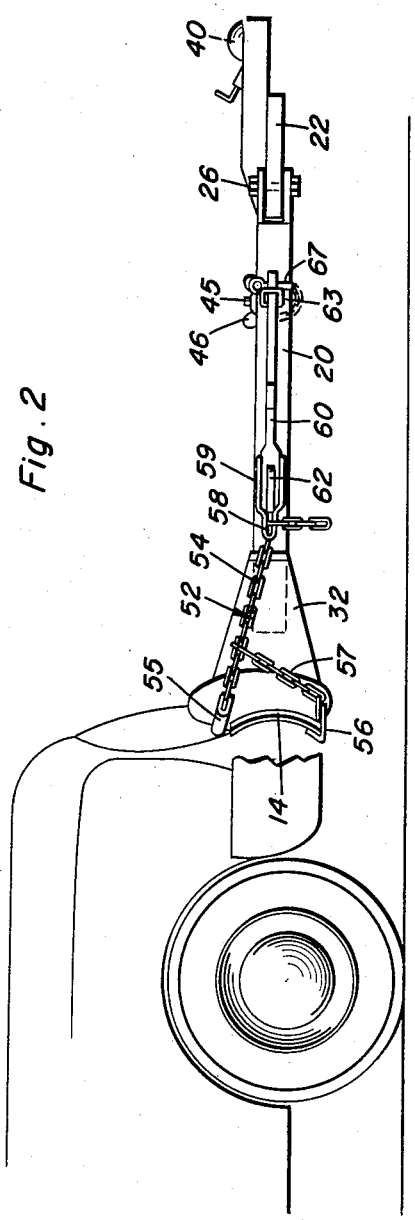
Figure 2 is a side view of the structure in Figure 1 with a part of the motor vehicle bumper being shown in section.

There are adjustable means 50 and 52 respectively carried by the draft arms 18 and 20, these means being for the purpose of attaching the towbar onto the bumper 14. Each of these adjustable means are identical in construction. They include chains 53 and 54, the chain 54 having hook 55 at one end, which is preferably made of a flat plate with a U-shaped end thereon. This hook is adapted to be secured behind the edge of bumper guard 15, and a similar, but not identical hook 56 is attached to the end of chain 57, the latter being attached to the chain 54 intermediate the ends thereof. The hook 56 is adapted to fit under the lower edge of bumper 14 (Figure 2). Chain 54 is fitted in slot 58 that is on toggle link 59, the latter being pivoted to lever 60. This lever is mounted for pivotal movement on pivot pin 61 that is carried by an ear 62 protruding laterally from draft arm 20. The end of the lever is held in place by loop 63 pivoted onto the draft arm 20 and arranged to fit over the end of the lever and held in place by means of chain supported pin 67. In use, the hooks 55 and 56 are attached to the bumper guard 15 and bumper 14 and a link of the chain fitted in slot 58 of toggle 59. Then, the lever 60 is swung to an over-center position and latched in place by being connected to loop 63.

The adjustable clamping means 50 include hooks 68 and 69, the latter being on short length of chain 70 which corresponds to chain 57. Toggle link 71 is adapted to connect to the chain 53 in the manner identical to the connection of the toggle link 59 and chain 54, while lever 72 corresponds in function and structure to lever 60.

Figure 3:
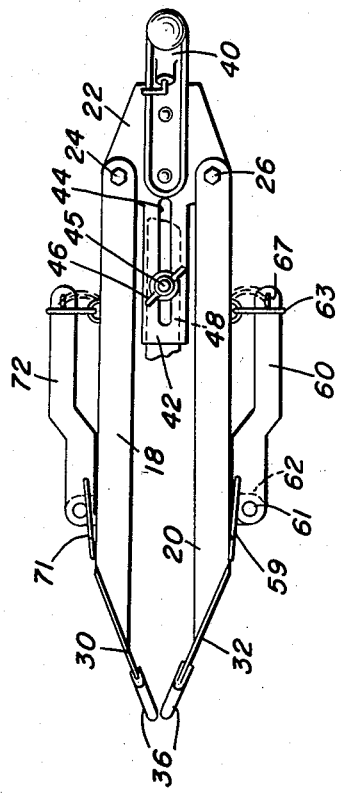
Figure 3 is a plan view of the hitch in the folded position.
Figure 4:
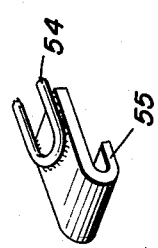
Figure 4 is a fragmentary perspective view of a clamp used as a part of the invention.

When not in use, the hitch is capable of being folded to a compact device as shown in Figure 3, thereby making it easy to store and to carry. In use, the draft arms 18 and 20 are spread and the brace 48 is connected in place. The pads 36 are brought to bear against the bumper 14 between the bumper guards 15 and 16 and the adjustable clamping means attached to the bumper 14 and the bumper guard on the opposite side from the draft arms.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In a motor vehicle having a bumper and a pair of bumper guards, a tow bar comprising a pair of draft arms having inner ends fitting flush against the bumper between the bumper guards, a support on which the other ends of said arms are pivoted for swinging of said arms into diverging relation to position said inner ends against the bumper guards, a cross bar slidably adjustably mounted on said support between said arms for sliding engagement with said arms to swing the arms, and means for clamping the inner ends of said arms against said bumper comprising a pair of levers pivoted on said arms for swinging into an overcenter position, a pair of flexible members each having a pair of hooks on one end thereof engaging said bumper and one of said bumper guards and having their other ends connected to said levers for tightening of the members by swinging of said levers, and links pivoted on said arms for swinging over said levers to hold the levers in overcenter position.

References Cited in the file of this patent

UNITED STATES PATENTS

| | | |
|---|---|---|
| 1,435,064 | Holmes | Nov. 7, 1922 |
| 1,836,806 | Larsen | Dec. 15, 1931 |
| 2,120,422 | Williams et al. | June 14, 1938 |
| 2,139,970 | Moore | Dec. 13, 1938 |
| 2,338,934 | Gross | Jan. 11, 1944 |

FOREIGN PATENTS

| | | |
|---|---|---|
| 429,954 | Italy | Feb. 6, 1948 |